Aug. 18, 1936.  J. GASKELL  2,051,698
APPARATUS FOR CUTTING GLASS
Filed Jan. 8, 1935  2 Sheets-Sheet 1

Inventor.
Joseph Gaskell
By
Morrison, Kennedy & Campbell
Attorneys.

Aug. 18, 1936.   J. GASKELL   2,051,698
APPARATUS FOR CUTTING GLASS
Filed Jan. 8, 1935   2 Sheets-Sheet 2

Inventor.
Joseph Gaskell
By Morrison, Kennedy & Campbell
Attorneys.

Patented Aug. 18, 1936

2,051,698

UNITED STATES PATENT OFFICE 2,051,698

APPARATUS FOR CUTTING GLASS

Joseph Gaskell, St. Helens, England, assignor to Pilkington Brothers Limited, Liverpool, England, a company of England Application January 8, 1935, Serial No. 869
In Great Britain January 8, 1934

3 Claims. (Cl. 49—48)

This invention relates to apparatus for cutting glass and has for its object an apparatus for cutting predetermined lengths off a strip of glass by continuous automatic operation.

According to the invention a cutter is reciprocated continuously across the glass, the stroke in one direction being operative and in the other direction inoperative. After the cutting stroke, automatic means operate to snap the glass along the cut. When the length to be cut off is so long as to need support, automatic means are provided for removing the cut off length, operative during the inoperative stroke.

The preferred snapping device comprises a holding bar adapted to press the glass on one side of the cut on to a bed and a snapping bar operated after the operation of the holding bar to strike the glass on the other side of the cut.

The preferred means for removing the cut off length consists of a pivoted conveyor adapted in its upper position to receive the length of glass to be cut off, and means for lowering the conveyor into an inclined position when the length is snapped off.

In the accompanying drawings:—

Figure 1:
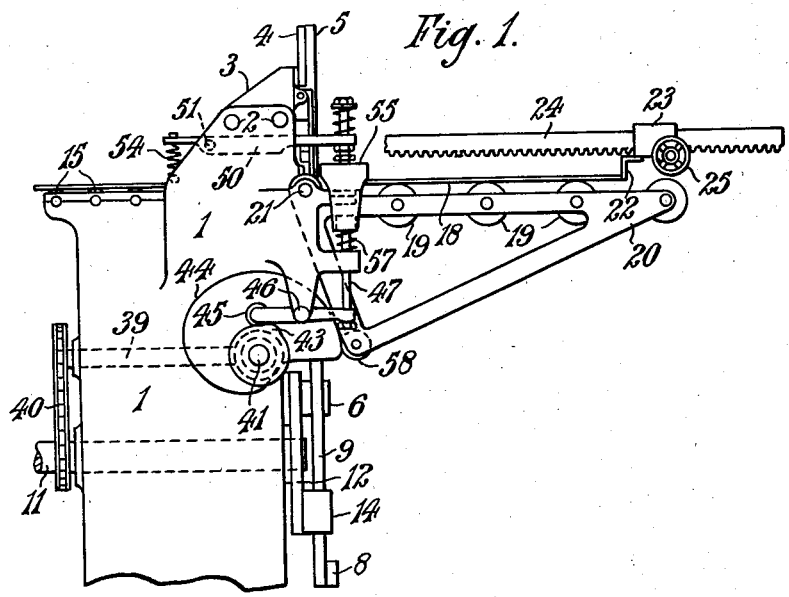
Figure 1 is a side view of the apparatus.

Referring to the drawings, the frame 1 carries two bars 2 along which the cutter carriage 3 is adapted to slide. The carriage is reciprocated by link 4, lever 5, pivoted at 6 to a bracket 7 on the frame, link 8 and arm 9, pivoted to the frame at 10. The driving shaft 11 carries a crank disc 12 with pin 13 turning in a crosshead 14 adapted to slide on the arm 9. The frame carries a feeding table at the front composed of rollers 15 and, to the right of these, a flat bed 16 (Figure 3), the back end of this bed being immediately under the line of cut 17. Back of the line of cut, the length of glass 18 to be cut off rests on a bed of rollers 19 carried by a frame 20 pivoted to the frame at 21.

Figure 2:
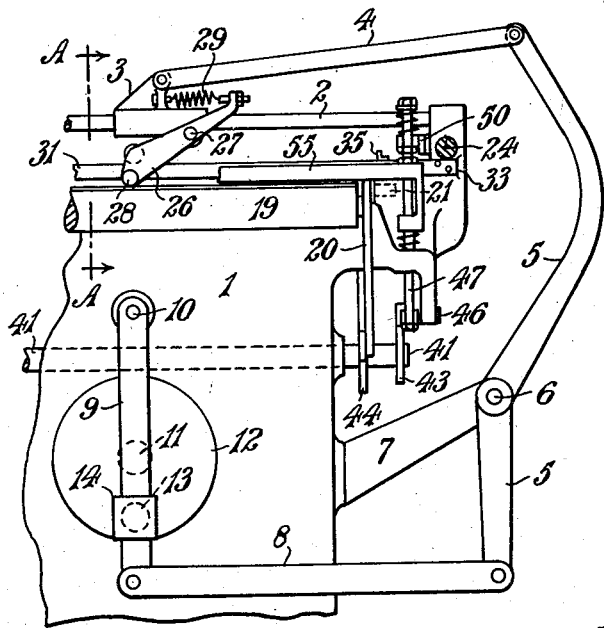
Figure 2 is a part back view thereof.

To determine the length of glass to be cut off, a fence 22 is carried on carriages 23 adapted to slide on two rack bars 24 (Figure 1), fixed to the frame as shown in Figure 2. The bars 24 are broken off in Figure 1 at the end where they are fixed to the frame, and in Figure 2 they are cut off before the carriages and fence. A hand-wheel 25 with cross shaft and pinions is carried by the carriages and the pinions engage the rack on the bars 24. Thereby the fence 22 can be moved to any desired position.

Figure 4:
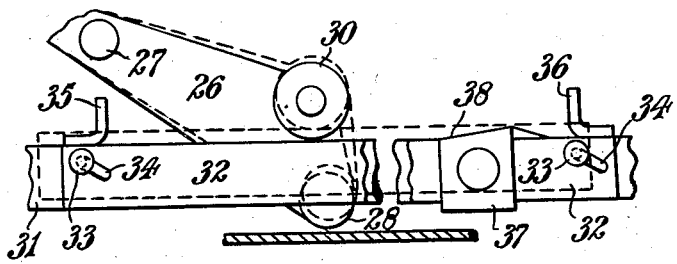
Figure 4 is a part front view of the device for rendering one stroke of the cutter inoperative.

The cutter bar 26 is pivoted to the carriage 3 at 27; at its lower end it carries the cutter disc 28 with diamond points, which are pressed on the glass by spring 29; it also carries a roller 30 which, while glass is being cut, is just clear of two cross bars 31 and 32. The bar 31 is fixed to the frame at 33 and serves to support the roller 30, and therefore the cutter bar 26, when there is no glass; the bar 32 is slightly attached to the bar 31 by means of two pins 33 fixed to the bar 31 engaging inclined slots 34 in the bar 32 (Figure 4). A stop 35 is attached to the bar 32 in position to be struck by the roller 30 at the end of the cutting stroke (to the left, as seen in Figure 4 and to the right as seen in Figure 2). When the roller so strikes the stop 35, it moves the stop and the bar 32 to the left, the slots 34 riding on the pins 33 and thereby raising the bar 32 and, by engagement of the bar with the roller 30, raising the cutter bar 26. The raised positions of the bar 32 and the cutter bars are shown in dotted lines in Figure 4. On the return stroke of the cutter, therefore, it is kept out of contact with the glass by the roller 30 running on the bar 32 in its raised position. A similar stop 36 is attached to the bar 32 at its other end and, when this is struck by the roller 30 at the end of the inoperative stroke, the bar 32 is moved back to its lower position.

Figure 3:
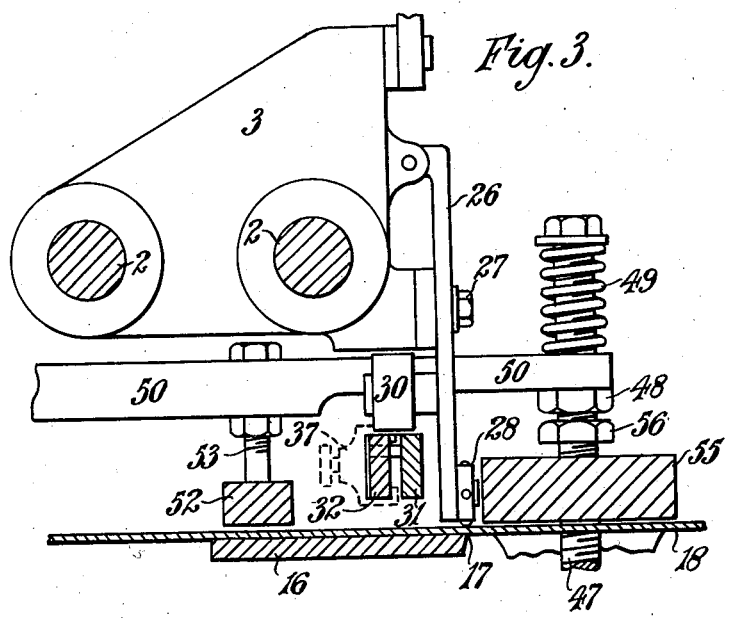
Figure 3 is a section through the line A—A of Figure 2, showing certain parts to a larger scale.

In order to prevent the diamond striking the edge of the glass on the operative stroke, a block 37 is adapted to slide on the bar 32 and to be fixed in any position thereon. In Figure 3 the block 37 is shown in dotted lines, since it is at the end of the bar which is not visible in this figure. The upper part of the block 37 has an inclined surface 38, adapted to engage the roller 30 so that, as this moves to the left in its operative stroke, the cutter is gradually lowered on to the glass and, by suitably adjusting the position of the block with reference to the edge of the glass, makes contact with it just after the edge has been passed.

The snapping and removing devices will now be described. A shaft 39 is driven by chain 40 (Figure 1) from the driving shaft 11. The shaft 39 drives a cross-shaft 41 by bevel gear 42. The shaft 41 carries at each end two cams 43 and 44. At each side of the apparatus the cam 43 operates a lever 45 pivoted to the frame at 46, so as to depress a vertical rod 47. Referring to Figure 3, in which the upper end of the rod 47 is shown, the rod carries a nut 48 on which is pressed, by the spring 49, the end of an arm 50 pivoted to the frame at 51 (Figure 1). The holding bar 52 is attached to the arm 50 by the bolt 53. When the rod 47 is depressed, the spring 49 presses down the arm 50 and the holding bar 52, and this holds the glass on to the bed 16. The spring 54, between the arm 50 and the frame tends to maintain the holding bar 52 clear of the glass. The snapping bar 55 is guided on the rod 47 and the nut 56 on the rod causes it to strike against the glass when the rod 47 is depressed. A spring 57 tends to maintain the snapping bar 55 clear of the glass. Play between the nut 56 and the bar 55 enables the holding bar 52 to hold the glass before the bar 55 strikes it.

The cam 43 is shaped to allow the lever 45 and rod 47 to return to their normal positions immediately after the rod has been depressed, so that the bars 52 and 55 are clear of glass fed forward during the inoperative stroke of the cutter.

The frame 20 carrying the rollers 19 carries rollers 58 engaging the cams 44. As the cams 43 operate the levers 45 to depress the rods 47, the cams 44 allow the frame 20 to turn clockwise about its pivots 21. The cut off length of glass 18 then falls with the frame 20, clear of the fence 22, and runs over the rollers 19 by its own weight.

The apparatus described operates continuously and automatically to cut off from pieces or strips of glass lengths determined by the position of the fence and to remove them, so that glass can be fed forward to the fence during each inoperative stroke of the cutter. The invention is not confined to the particular devices shown and described for performing these operations.

Having described my invention, I declare that what I claim and desire to secure by Letters Patent is:—

1. Apparatus for cutting off lengths of glass comprising a bed for receiving the glass, a fence adjustable to determine the position of the forward edge of the glass, a cutter adapted to be reciprocated across the glass with alternate operative and inoperative strokes, a glass snapping device, continuously operating driving means adapted to reciprocate the cutter, means geared with the driving means timed to operate the snapping device at the start of the inoperative stroke of the cutter, and means geared with the driving means timed to remove the cut-off length after the operation of the snapping device and before the end of the inoperative stroke.

2. Apparatus for cutting off lengths of glass comprising a bed for receiving the glass, a fence adjustable to determine the position of the forward edge of the glass, a cutter adapted to be reciprocated across the glass with alternate operative and inoperative strokes, a glass snapping device, means for disengaging the cut-off length from the fence, continuously operating driving means adapted to reciprocate the cutter, means geared with the driving means timed to operate the snapping device at the start of the inoperative stroke of the cutter and means geared with the driving means timed to operate the means for disengaging the cut-off length from the fence after the operation of the snapping device and before the end of the inoperative stroke.

3. Apparatus for cutting off lengths of glass comprising a stationary section of bed and a movable section of bed for supporting the stock and the cut-off length of glass respectively, a fence adjustable to determine the position of the forward edge of the glass, a cutter adapted to be reciprocated across the glass with alternate operative and inoperative strokes, a glass snapping device continuously operating driving means adapted to reciprocate the cutter, means geared with the driving means timed to operate the snapping device at the start of the inoperative stroke of the cutter and means geared with the driving means timed to move the movable bed to remove the cut-off length before the end of the inoperative stroke.

JOSEPH GASKELL.